United States Patent Office 2,797,136
Patented June 25, 1957

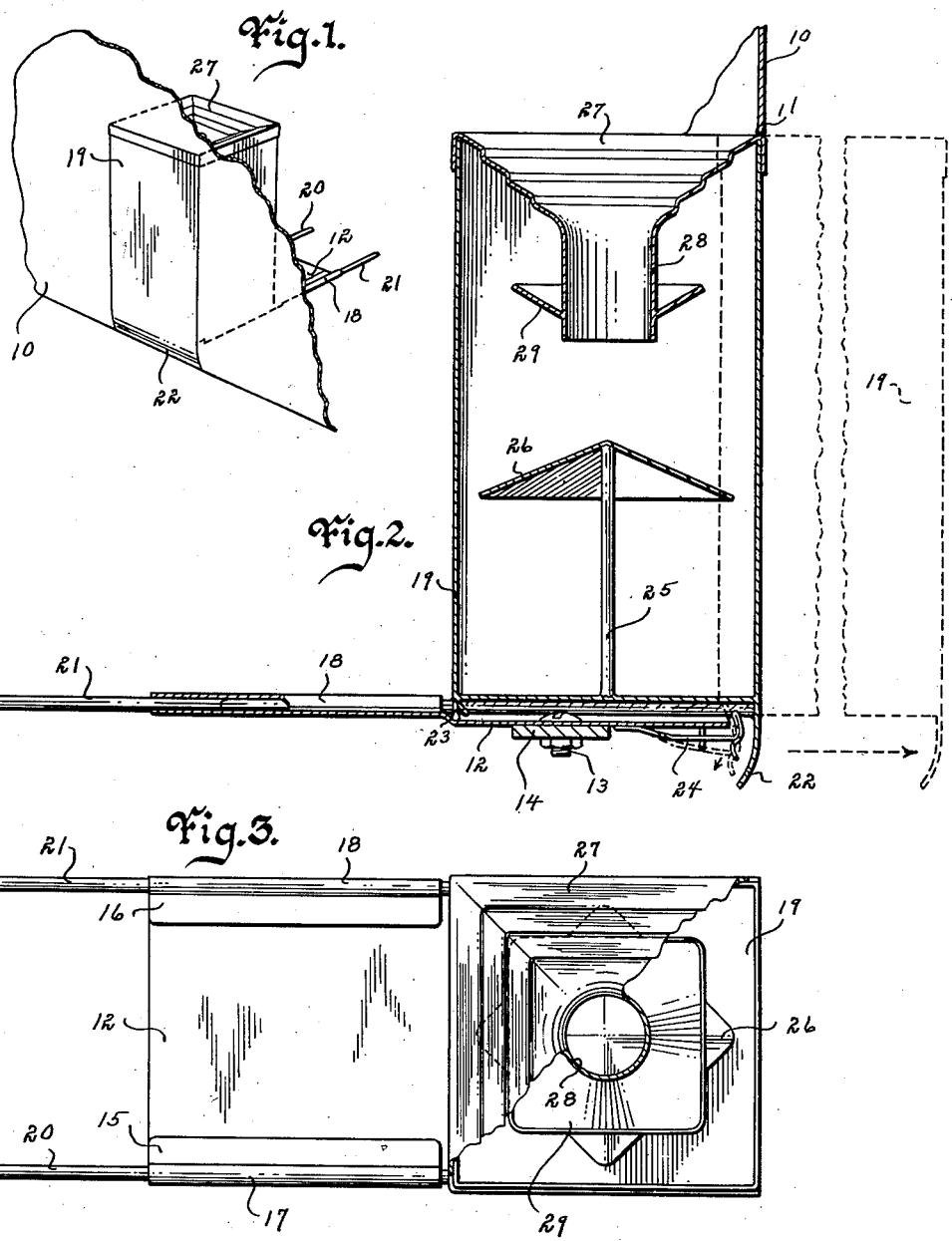

2,797,136

DISAPPEARING ASH RECEPTACLE

Nels H. Nelson, Spencer, Iowa

Application October 14, 1953, Serial No. 385,958

8 Claims. (Cl. 312—246)

This invention relates to tobacco ash receptacles and more particularly to disappearing containers used in connection with and to the instrument panel of automotive vehicles such as automobiles, trucks, airplanes, trains and like.

The use of ash receptacles on the instrument panels of automobiles is now common. However, such vehicle ash receptacles are costly to manufacture, tend to rattle, and require the user to snuff out the cigar, cigarette or like on a grid in the top of the receptacle prior to placing the cigarette or cigar butt in the receptacle. This latter requirement is not only unsanitary and inconvenient, but in the case of the driver of the vehicle it is dangerous, due to the fact that he must, at least momentarily, take his eyes from the roadway, observe the operation, and use one hand for grinding out the ignited tobacco.

Therefore, the principal object of my invention is to provide a small, compact tobacco ash receptacle that automatically extinguishes the lighted cigar or cigarette.

A further object of my invention is to provide a vehicle tobacco ash receptacle that has yielding means for preventing its rattling when installed on the instrument panel of a vehicle.

A still further object of this invention is to provide a tobacco ash receptacle that has downwardly sloping steps in the hopper portion for facilitating the travel of the collected matter placed thereon.

Still further objects of this invention is to provide an ash receptacle that is economical in manufacture, refined in appearance, and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my tobacco ash receptacle installed within the instrument panel of a vehicle and in closed condition, Fig. 2 is an enlarged vertical longitudinal sectional view of the device with broken lines showing its effective open position for use, and Fig. 3 is a top plan view of my ash receptacle with sections cut away to more fully illustrate its construction.

In these drawings I have used the numeral 10 to generally designate the instrument panel of an automotive vehicle. It is customary in such instrument panels to have a rectangular cut away portion for receiving the usual hinged ash receptacle. My invention utilizes a similar cut out portion in the instrument panel and which I have designated by the numeral 11. It is to such an instrument panel that I install my device and which I will now describe in detail.

The numeral 12 designates the horizontal base portion of my device which is secured by any suitable means such as the bolt 13 to the horizontal supporting brace member 14 located forward of the face of the instrument panel. This horizontal base 12 may be formed of any suitable sheet material and has its two forward side edge portions 15 and 16 respectively, bent back upon itself to form the two bearings 17 and 18 as shown in Fig. 3. These bearings 17 and 18 extend parallel to each other and are substantially forward of the face of the instrument panel 10. The numeral 19 designates a receptacle box or like portion open at its top and having secured by any suitable means to its bottom the two forwardly and horizontally extending spring rods 20 and 21. These two spring rods 20 and 21 are slightly spread as they extend forward so that when they are slid into the bearing portions 17 and 18 as shown in Fig. 3, they will be under spring tension, thereby yieldingly holding the container portion 19 at any desired position of its sliding movement and also holding the same against undesirable noise or rattle. The positions of the bearing portions 17 and 18 forward of the instrument panel are such that when the device is placed in a closed position, its back side will be flush with the instrument panel as shown in Fig. 2. The lengths of the spring rods 20 and 21 are such that the container 19 may be moved outwardly and to the rear and to an open position for use with the spring rods 20 and 21 still within the bearing portions 17 and 18, thereby successfully supporting the receptacle in a usable position.

To facilitate the manual moving of the receptacle to a rear position for usage as shown by broken lines in Fig. 2, I have provided a finger flange 22. This portion 22 is a continuation downwardly of the face of the container and extends substantially below the horizontal plane of the base portion 12. On the forward bottom of the receptacle 19, I have provided a downwardly extending stop means 23. The numeral 24 designates a spring latch means secured to the bottom rear portion of the member 12. This member 24 extends upwardly to the rear of the portion 12 and is for engaging the stop 23 for preventing the accidental complete withdrawal of the receptacle portion from the base member 12.

When it is decided to completely remove the receptacle unit, the spring latch means 24 is manually held in a lowered position, thereby permitting the complete sliding of the spring rods 20 and 21 from the bearing members 17 and 18. To replace the unit, it is merely necessary to guide the spring arm rods 20 and 21 into the bearing members 17 and 18. I have pointed the forward free ends of these spring rods 20 and 21 to facilitate the guiding of the same into the bearing members.

On the center inside bottom of the member 19, I have a vertical post 25. On the top of this post I have mounted a rectangular cone shaped baffle member 26 having a diameter less than the diameter of the rectangular receptacle portion 19. This member 26 is rotated one-eighth of a turn relative to the member 19 to bring its side edges out of parallel relationship with the sides of the member 19 as shown in Fig. 3. The numeral 27 designates the lid hopper portion detachably resting on the top of the portion 19 and extending downwardly and inwardly to terminate with the center vertical tube portion 28. The bottom of this tube portion 28 communicates with the inside center of the member 19 and is spaced above the cone 26. The principal feature, however, of the hopper 27 is that its downwardly and inwardly extending walls are horizontally corrugated to provide downwardly and inwardly extending step portion as shown in Fig. 2. These sloping step portions of the hopper top are most important, inasmuch as they overcome the smooth surface of the receiver which has hereabove allowed the sticking thereto of a wet cigar or cigarette butt. By my hopper top being so step-corrugated, the wet end of the cigar or cigarette cannot come in complete contact with the receiver surface and, therefore, will not stick to the same, but will slide directly into and through the tube portion 28. Another advantage of this sloping step portion of the hopper top is that, regardless of how the cigarette butt is placed thereon, it will roll automatically to a lighted end first position as it enters into the tube portion 28. This eliminates the cigarette butt becoming cross positioned relative to the tube 28 and wedging therein.

On the outer side of the lower portion of the tube 28, I have provided a horizontal inverted rectangular baffle 29. This baffle 29 extends in a direction upwardly and opposite from that of the baffle 26 and is rotated one-eighth of a turn relative to the baffle 26 so that its side edges are parallel with the sides of the receptacle 19 as shown in Fig. 3. The dimensions of this member 29 is substantially that of the member 26 and is of a diameter less than the inside diameter of the receptacle 19.

When emptying the device, the detachable hopper top is removed, thereby providing rapid discharge of the collected matter from the receptacle portion 19 and also permitting the successful cleaning of the unit. When an ignited cigar or cigarette butt is dropped into the hopper portion, it will pass downwardly through the tube 28, strike the top of the baffle 26, and thence will fall to the bottom of the receptacle portion 19 below the baffle 26. Inasmuch as the baffle 26 is directly below the free bottom end of the tube 28, any smoke or odors from such ignited tobacco will have to pass up at the sides of the baffle 26 and to the side of the open tube 28, where the same is trapped. To aid this normal flow of smoke, odors and like, the same is promoted by the inverted baffle portion 29. Also this baffle member 29 prevents the downward flow of the smoke or like to a point where it would be reversed and pass directly upwardly through the tube 28. Thus, it is unnecessary to snuff out a cigar or cigarette lighted butt. The driver of a vehicle merely has to drop the same into the hopper and the lighted cigarette or cigar will be automatically and quickly extinguished for lack of oxygen. Therefore, my device makes driving safer, the hands are not soiled by any snuffing of the lighted cigarette before it is placed in the receptacle and furthermore, by my construction and arrangement of parts, an ash receptacle of considerable capacity is provided. Inasmuch as it is as easy to place a lighted cigarette butt in my receptacle as it is to throw the same out of the window of the vehicle, fire hazards along the highway are eliminated.

While I have described my tobacco ash receptacle as installed in an automotive vehicle, obviously it may be used successfully at other locale. It is particularly true as to the steps of the hopper top which may be successfully applied in any type of smokestand.

While I have described the portion 19 as of rectangular structure, it can be of any suitable shape. However, when a rectangular structure is used, the baffle members 26 and 29 should be of rectangular shape and when rotated relative to each other as shown in Fig. 3, they are most effective while at the same time permitting sufficient space for the downward movement of the discarded tobacco matter.

Some changes may be made in the construction and arrangement of my disappearing ash receptacle without departing from the real spirit and purpose of my invention, and it is my intention to cover by my claims, any modified forms of structure or use of mechanical equivalents which may be reasonably included within their scope.

I claim:

1. In a device of the class described, a container portion, a base portion having two spaced apart parallel bearing members, two spaced apart parallel arms on said container slidably extending into said two bearing members respectively, a hopper top on said container portion terminating in an opening, a tube secured to said hopper top communicating with its opening, an inverted rectangular cone member embracing said tube, a post in the inside bottom of said container portion, and a rectangular cone shaped baffle member on said post; said inverted cone shaped baffle member and said last mentioned rectangular cone shaped baffle member being rotated at forty-five degrees relative to each other.

2. In a device of the class described, a container portion, a base portion having two spaced apart parallel bearing members, two spaced apart parallel arms on said container slidably extending into said two bearing members respectively, a corrugated hopper top on said container portion terminating in an opening, a tube secured to said hopper top communicating with its opening, an inverted rectangular cone member embracing said tube, a post in the inside bottom of said container portion, and a rectangular cone shaped baffle member on said post; said inverted cone shaped baffle member and said last mentioned rectangular cone shaped baffle member being rotated at forty-five degrees relative to each other.

3. In a device of the class described, a container portion, a base portion having two spaced apart parallel bearing members, two spaced apart parallel arms on said container slidably extending into said two bearing members respectively, a corrugated hopper top on said container portion terminating in an opening, a tube secured to said hopper top communicating with its opening, an inverted rectangular cone member embracing said tube, a post in the inside bottom of said container portion, and a rectangular cone shaped baffle member on said post, said cone shaped members being rotated in a skewed relative position to each other.

4. In a device of the class described, a container portion, a base portion having two spaced apart parallel bearing members, two spaced apart parallel arms on said container slidably extending into said two bearing members respectively, a hopper top on said container portion terminating in an opening, a tube secured to said hopper top communicating with its opening, and two oppositely disposed rectangular conical baffles in said container below said hopper for retaining smoke in said container, said conical baffles being disposed in askewed relative position to each other.

5. In a device of the class described, a container portion having four side walls providing an inside rectangular area, a base portion having two spaced apart parallel bearing members, two spaced apart parallel arms on said container slidably extending into said two bearing members respectively, a hopper top on said container portion terminating in an opening, a tube secured to said hopper top communicating with its opening, an inverted rectangular cone member embracing said tube, a post in the inside bottom of said container portion, and a rectangular cone shaped baffle member on said post; the sides of said rectangular cone shaped baffle member on said post being in non-parallel relationship with the sides of said container portion.

6. In a device of the class described, a container portion having four side walls providing an inside rectangular area, a base portion having two spaced apart parallel bearing members, two spaced apart parallel arms on said container slidably extending into said two bearing members respectively, a corrugated hopper top on said container portion terminating in an opening, a tube secured to said hopper top communicating with its opening, an inverted rectangular cone member embracing said tube, a post in the inside bottom of said container portion, and a rectangular cone shaped baffle member on said post, the sides of the cone shaped baffle member on said post being in non-parallel relationship with the sides of said container portion.

7. In a device of the class described, a container portion having four side walls providing an inside rectangular area, a base portion having two spaced apart parallel bearing members, two spaced apart parallel arms on said container slidably extending into said two bearing members respectively, a hopper top on said container portion terminating in an opening, a tube secured to said hopper top communicating with its opening, and two oppositely disposed rectangular conical baffles in said container below said hopper; one of which is above the other and secured to said tube and the other baffle positioned in a lower plane therefrom, the sides of the lower of said two conical baffles being in non-parallel relationship with the sides of said container portion.

8. In a device of the class described, a container portion having four side walls providing an inside rectangular area, a base portion having two spaced apart parallel bearing members, two spaced apart parallel arms on said container slidably extending into said two bearing members respectively, a hopper top on said container portion terminating in an opening, a tube secured to said hopper top communicating with its opening, an inverted rectangular cone member embracing said tube, a post in the inside bottom of said container portion, a rectangular cone shaped baffle member on said post; the sides of said inverted rectangular cone member being parallel to the sides of said container portion, and the sides of the rectangular cone shaped baffle member on said post being in non-parallel relationship to the sides of said container.

References Cited in the file of this patent

UNITED STATES PATENTS

| | | |
|---|---|---|
| 1,286,297 | Haertel | Dec. 3, 1918 |
| 1,695,346 | Reese | Dec. 18, 1928 |
| 1,719,925 | Cruess | July 9, 1929 |
| 2,323,045 | Jackson | June 29, 1943 |
| 2,443,381 | Farrar | June 15, 1948 |

FOREIGN PATENTS

| | | |
|---|---|---|
| 165,725 | Austria | Sept. 15, 1950 |
| 331,530 | Great Britain | June 25, 1930 |
| 703,138 | France | Apr. 25, 1931 |